April 14, 1959     C. R. SACCHINI ET AL     2,881,881
BIDIRECTIONAL NO-BACK COUPLINGS
Original Filed June 1, 1954
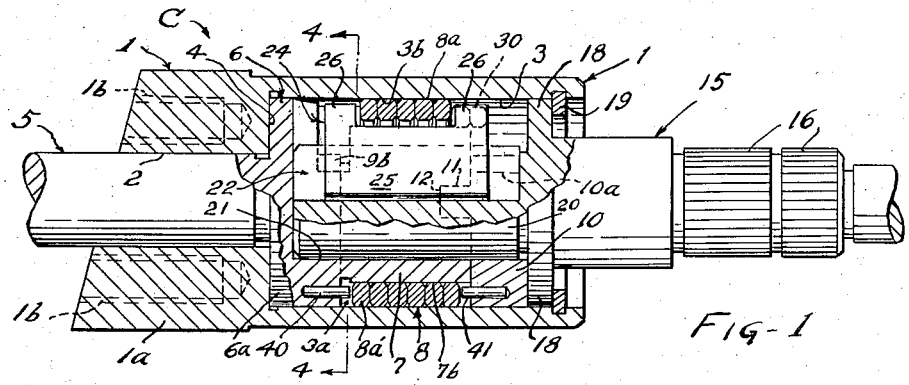
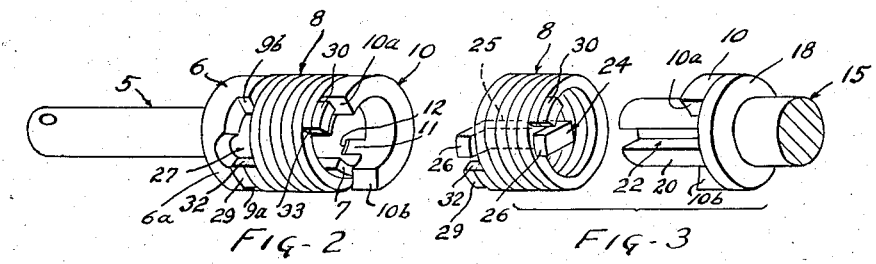
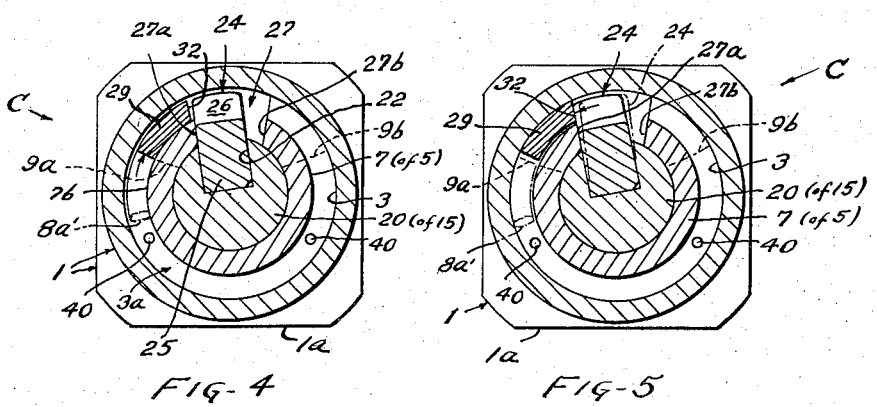
INVENTORS
COLUMBUS R. SACCHINI
DONALD R. TOMKO
BY
George M. Soule
ATTORNEY United States Patent Office 2,881,881
Patented Apr. 14, 1959

2,881,881

BIDIRECTIONAL NO-BACK COUPLINGS

Columbus R. Sacchini, Willowick, and Donald R. Tomko, Cleveland, Ohio, assignors, by mesne assignments, to Curtiss-Wright Corporation, Marquette Metal Products Division, Cleveland, Ohio, a corporation of Delaware Continuation of application Serial No. 433,630, June 1, 1954. This application August 28, 1957, Serial No. 680,895

5 Claims. (Cl. 192—8)

This application is a continuation of our application Serial No. 433,630 filed June 1, 1954, and now abandoned.

The invention relates to a known type of anti-back-drive brake and coupling mechanism wherein a helical friction spring in a non-rotary housing is arranged to enable bidirectional rotation of an input shaft to transmit torque through a coaxial output shaft while substantially blocking the output shaft from rotation in either direction, or in any event such rotation as can transmit torque to the input shaft as from the output-shaft-connected load. Two specific examples of the type of mechanism outlined or described above, hereinafter for brevity called simply a "no-back coupling" are given in W. C. Starkey Patent 2,421,814 issued June 10, 1947.

It is fairly well known that couplings of this type, at least as usually built, inherently have some "backlash," i.e. permitted or possible non-useful angular motion of both input and output shafts or terminal members from certain positions of rest. Since the backlash in many types of applications is highly undesirable the no-back couplings are so designed as to minimize it, and this can easily lead to faulty operation through non-compliance with design-specified manufacturing tolerances. One of the objects of the present invention is to make close tolerances less critical to proper operation despite design for negligible backlash.

Another object is to provide a no-back coupling employing a single helical friction spring, wherein the spring can be inexpensively formed and finished to exact dimensions internally and externally of its coils as by grinding, whereby generally to improve operation of the coupling as will be further explained, and, incidentally, to enable easy assembly of the spring and its co-operating parts into accurately operating relationship.

Another object is to provide a no-back coupling of the above identified type in which the necessary "releasing" actions on the helical spring for enabling torque transmission from input to output through the coupling cannot be accompanied by excessive radial deflection of the end coil of the spring which is involved in the release operation out of substantially circular form, since such deflection is quite likely to cause defective operation of the coupling, particularly if backlash is reduced to the minimum.

A further object is to provide means in said type of coupling whereby the necessary releasing and energizing shoulders which act upon the two ends of the helical spring can be easily formed in precise angular working relationship to co-operating shoulders of the spring and whereof all the rotary parts can be assembled as a self contained unit or sub-assembly axially into working relative position in the housing without requiring pinning into place of any of the components or, in other words, without requiring such securing or fastening operations or devices as tend to complicate disassembly when or if such is required.

A still further object is to provide a no-back coupling of the above identified type in which the helical spring is fully supported against movement of its coils out of their desired working relationship to each other and the co-operating parts in a manner to cause harmful binding or wedging action during the required operation of the coupling.

In the drawing,

Fig. 1 is principally a central longitudinal sectional view of the present no-back coupling assembly, the illustrated portions of the input and output shafts being shown mainly in side elevation.

Fig. 2 is a semi-perspective reduced scale assembly view of the input shaft and helical spring.

Fig. 3 is a reduced scale exploded semi-perspective view of an inner end portion of the output shaft, a key carried thereby and the helical spring.

Figs. 4 and 5 are cross sectional detail partly diagrammatic views, both taken approximately along the line 4—4 on Fig. 1.

In Figs. 1, 4 and 5 the non-rotary metal housing 1, as a typical form, has a base portion 1a of generally rectangular cross section adapted for fixed attachment to the frame of a mechanism to be served by the no-back coupling C hereof. The base portion 1a is secured to such frame by screws, not shown, entering threaded openings 1b, Fig. 1. A cylindrical bore 2 extends through the base portion 1a of the housing into a generally cylindrical counterbore 3 concentric with bore 2 and defined in part by an axial shoulder surface 4 (bottom of counterbore). The cylindrical surface of the counterbore 3 is very accurately finished as by grinding to close diameter limits.

Rotary input shaft 5 extends through the bore 2 of the housing and has a generally cylindrical enlarged integral head 6, a disc-like portion 6a of which is freely turnable inside the counterbore 3 and in axial abutment with shoulder 4 to prevent endwise movement of the input shaft out of the housing to the left. A reduced diameter generally cylindrical mutilated sleeve portion 7 of the head 6 (sleeve longitudinally slotted at 27 as more fully described later) forms with the surrounding counterbore surface 3 an annular cylindrical chamber or pocket 3a which is occupied by the helical friction spring 8 also to be further described. Surface portion 3b of the wall of the counterbore 3 constitutes the brake drum surface which is frictionally engaged by the external or radially outward gripping surface or surfaces 8a of the various coils of the spring 8.

Operating essentially as a part of the input shaft 5, a collar 10 (incomplete annulus or C shaped ring as best shown in Fig. 2) is turnably mounted in the counterbore 3, being of substantially the same outer diameter as the disc portion 6a of head 6, and being coupled with said head 6 by diametrally disposed lug and slot formations 11, 12 of the collar 10 and shaft sleeve portion 7 respectively, as partially shown in Fig. 2.

The output shaft 15 as shown in Fig. 1, is serrated at 16 to enable coupling of the shaft to a rotary load-connected part (not shown). The shaft 15 has a circular disc portion 18 freely turnable in the counterbore 3 of the housing 1 and retained in axial position between the collar 10 and a conventional snap ring 19 in an inner peripheral groove of the housing as evident from the drawing. A generally cylindrical stub portion 20 of the output shaft 15 extends, as an aligning or pilot bearing for the two shafts 5 and 15, into a socket 21 of the input shaft head 6. The stub portion 20 of output shaft 15 has a longitudinal transversely rectangular key slot at 22 (of Figs. 1 and 4) for approximately its full length. A generally U-shaped flat key 24 has its base portion 25 removably fitted to but snug in the key slot, the key 24 being retained in position axially of the assembly principally by the helical spring 8 as is evident from Figs. 1 and 3. The key 24 has two parallel identical spring-controlling arms 26 which reach radially outwardly into the spring-containing annular pocket 3a through the longitudinal slot 27 in the sleeve portion 7 of the input shaft 5. The side-defining and outwardly diverging surfaces 27a and 27b, Fig. 4, of slot 27 are considerably wider apart circumferentially of said sleeve portion 7 than the key width, whereby to permit limited angular relative movement or lost motion between the two shafts 5 and 15 which movement is needed for proper control of the helical spring 8.

The helical spring 8 is accurately formed to simple cylindrical shape as by outer diameter grinding so that its gripping surfaces 8a are normally in fairly tight interference fitting relationship to the coacting internal drum surface 3b of counterbore 3 for the full length of the spring. Thus the spring is strongly self energizing. When the spring coils are seated against the drum surface the inside-diameter-defining surfaces of the coils, which are also accurately formed as by internal grinding, are slightly spaced from the outer peripheral surface of the sleeve portion 7 of the input shaft. The spacing is only sufficient to enable the spring to be caused to lose its grip on the drum by radial contraction of at least some of the spring coils as will be explained. Such necessary contraction of the spring coils is accomplished by what will be called a de-energizing operation performed at one or the other end of the spring, depending upon the direction of rotation of the input shaft. Deenergizing in the two directions respectively preferably is effected by circumferentially spaced circularly milled and very accurately interrelated shoulders 9a and 10a on the head 6 of the input shaft and the collar 10 (latter considered part of that shaft), which shoulders 9a and 10a engage associated lugs 29 and 30 (Fig. 2) formed as blocks rigidly attached to the spring end coils.

Fig. 4 illustrates deenergizing of the spring 8 through operation of shoulder 9a on the adjacent abutment surface of lug or block 29 to enable clockwise movement of the input shaft 5 (represented by its sleeve portion 7) by turning of the output shaft 15 through engagement of sleeve shoulder 27a of slot 27 with the U-shaped key 24 in the output shaft portion 20. Lug 29 and an adjacent portion 8a of the spring end coil (partially but exaggeratedly shown in Fig. 4) are illustrated as having been moved radially inwardly against the sleeve portion 7 by the above described deenergizing operation. The sleeve portion 7 actually prevents all but negligible deflection of the end coil of the spring out of circular form; and, incidentally, the contraction of coils out of contact with drum surface 3b is only sufficient to permit rotary movement of shafts 5 and 15.

Fig. 5 shows an "energizing action" of one of the key arms 26 on the circumferential terminus 32 of end coil 8a'. Such energizing action is only permissive as to the spring 8 since the latter is self energizing due to the described interference fitting against the drum surface 3b. Identical shoulders or abutments 32 and 33 at the two ends of the spring are shown in Fig. 2 as flush surface portions of the lugs or blocks 29 and 30 and the associated spring ends. The Fig. 5-illustrated, spring energizing action occurs as a result of attempted turning of the output shaft 15 and its key 25 counterclockwise beyond the full-line-illustrated position of the key Fig. 5. An extremely slight amount of counterclockwise movement on part of both input shaft and output shaft occurs between the two conditions illustrated by Figs. 4 and 5.

Since the spring 8 and the effective coacting shoulders associated with the shafts are substantially symmetrical at the two ends of the spring, the same (above described) operations demonstrated by Figs. 4 and 5 occur at the right hand end of the spring as viewed in Fig. 1 to permit driving of the output shaft 15 by the input shaft 5 and to prevent back driving as earlier above outlined. The type of operation involved is well understood in the art.

The reason for requiring a considerable angular or circumferential spacing of the shoulders 27a and 27b (Fig. 4) of slot 27 relative to the width of the key 24 will be understood by consideration of the facts that the "energizing" and deenergizing shoulder actions at the two ends of the spring must not conflict with each other and the spring requires substantial angular relative movement of its two ends in contracting the spring the necessary amounts for release.

The lugs or blocks 29 and 30 are very easily made so as not to project radially inwardly or outwardly from the inner and outer peripheral surface of the spring coils by using somewhat elongated pieces of the spring stock to form the lugs, these pieces being brazed or otherwise firmly secured to the spring end coils. That manner of providing the lugs or blocks 29 and 30 greatly facilitates final finishing of the spring by internal through grinding and external (e.g. centerless) grinding, the same as can be done with the simplest possible or cylindrical form of helical clutch spring. Additionally, since the radially facing surfaces of the lugs or blocks 29 and 30 are substantially flush with the associated external and internal coil surfaces, the lugs seat against drum surface 3b or the sleeve surface 7b when the associated spring end coils expand and contract in operation. Thereby no bending moment likely to detach the lugs from their associated end coils is ever imparted to the lugs, as in a radial direction, during operation of the various abutment shoulders on the lugs in case the abutting faces are not mutually parallel. The drum and sleeve surfaces 3b and 7b, in other words, prevent the lugs from being deflected as cantilevers in radial planes parallel to the working axis of the coupling.

In assembling the various parts of the no-back coupling C, one simple procedure enabled by the described construction is as follows: The split collar 10 is first slid over the stub 20 of the output shaft 15 with its shoulders 10a and 10b positioned relative to slot 22 of the stub about as illustrated by Fig. 3, and the spring 8 and key 24 (loosely assembled as shown in the same view) can then be slid into final position over the stub 20 as will be apparent. The now self contained or self positioning sub-assembly constituted by parts 8, 10, 15 and 24 (assuming the lugs 11 of collar 10 are now turned to align with slots 12 of input shaft sleeve portion 7), is next applied to the input shaft, by sliding the stub 20 with the rest into final relatively telescoped position on the input shaft (cf. Fig. 1). The now complete and self contained sub-assembly of all the rotary parts is now inserted into the housing 1, and while so doing the spring 8 can be contracted radially, through manipulation of the free ends of the two shafts 5 and 15 so that the spring can be easily slid into final position in counterbore 3 notwithstanding its normal tightness against its coacting drum surface 3b. Insertion of snap ring 19 is, of course, the last step or assembly operation. It will be apparent from the above that the spring 8 and key 24 have no preferential position endwise, which further facilitates assembly of the mechanism.

The forming of the input-shaft-operated spring release shoulders 9a—9b and 10a—10b as identical pairs of shoulders (each pair being preferably formed as a single circular milling operation) makes the assembly capable of using, interchangeably, right or left hand wound springs. Only the release shoulders 9a and 10a function in the illustrated assembly as will be apparent from Fig. 2. Shoulders 9b and 10b would function in case a left hand wound spring 8 were to be substituted.

A further feature of the invention is the provision of a simple and inexpensive but highly effectual means for preventing relative dislocation of the coils of spring 8 endwise or obliquely of the assembly as a whole but without possibility of restraining the spring in its necessary operations as described above. For the just indicated purpose spring clutches sometimes include so called "helix plates" which are rather expensively machined to conform to the slope or pitch of the axially exposed faces of the coils. In the present construction, sets of pins 40 and 41 of appropriate length (see Figs. 1 and 4) are supported respectively by the disc portion 6a of the input shaft 5 and by the collar 10 in positions to support the end coils of the spring as would such helix plates as mentioned. Since the collar 10 is made separately from the input shaft it is an easy matter to drill the necessary dead ended holes or sockets for the pins 40 and 41 which, as shown in Fig. 1, are parallel to the common axis of the shafts 5 and 15. The pins of each set are pressed to the bottoms of the holes to insure retention of the exposed ends of the pins in proper location relative to the associated spring end surfaces. The two pins 40 shown in Fig. 4 (and similarly the pins 41 of the collar 10) project different distances from the disc so as to be uniformly but slightly spaced from the respective helically disposed end coil surfaces of the spring.

We claim:

1. A bidirectional no-back coupling of the type wherein a spring tempered helical friction spring of approximately cylindrical form normally grips a mating circular, non-rotary drum surface of a housing and has spring-releasing shoulders at its opposite ends operated by correspondingly positioned spring-releasing shoulders of a rotary input member to enable angular movement of a coaxial output member by the input member, and wherein a pair of spring-energizing shoulders operatingly integral with the output member abut, respectively, other shoulders on relatively opposite ends of the spring in a manner to prevent, through drum-gripping action of the spring, the output member from being turned out of input-member-adjusted position by its connected load; characterized in that the spring releasing shoulders of the spring are provided on metal lugs formed separately from the spring and operatingly rigid with end coils of the spring and located in alignment with the spring coils, axially of the spring, and the spring-releasing shoulders of the input member as well as the spring-energizing shoulders operatingly integral with the output member are located in alignment with coils of the spring axially of the spring.

2. The no-back coupling of claim 1, wherein a portion of the input member lies within an axial bore of the housing constituting the drum surface thereof and comprises two readily axially separable coaxial sections, each having one of said spring-releasing shoulders, one of the sections having an axial opening eccentric to the common axis and the other section having an axial tongue snugly fitting the opening to prevent relative angular movement of the sections during operation of the coupling.

3. The coupling of claim 2 wherein a portion of the output member within the housing is telescopingly received within axial bore portions of said input member sections respectively, the said portion of the output member has a slot open radially and also open axially of the output member toward the input member, a U-shaped key lying snugly in the slot but being readily slidable axially out of it at its open end provides the spring energizing shoulders on radially extending arm portions of the key lying at respective ends of the spring, whereby the relatively telescoping portions of the input and output members, with the key and spring in operating position relative thereto, constitute a readily demountable subassembly capable of being inserted axially into an open end of the housing bore, together with means demountably engaging the housing in a manner to hold the subassembly in the housing bore.

4. A bidirectional no-back coupling, comprising a non-rotary housing having an axial bore, coaxial input and output torque-transmitting members extending into the bore from opposite directions and supported for rotation in said bore, key means for coupling the members in a manner to limit relative angular movement of the members yet enabling transmission of torque by the input member to the output member in two directions, a helical friction spring of cylindrical form normally in friction contact with a drum-constituting surface portion of said bore, blocks secured rigidly to the two ends of the spring and being wholly aligned with associated coils of the spring axially thereof, each of said blocks providing a pair of circumferentially and relatively oppositely disposed and circumferentially facing abutments at each end of the spring, each pair of abutments being in angularly offset relation to the other pair, said key means between the members including a longitudinal slot in the output member, a correspondingly positioned but wider longitudinal slot in the input member, and a key snugly occupying the slot of the output member and disposed circumferentially between the two pairs of spring abutments and the sides of the slot of the input member, the key having operatively integral radial arms loosely embracing coil portions of the spring endwise of the spring so that the key is held in position axially of the spring by said spring for contact respectively with one of the spring abutments of each pair, depending upon the direction of attempted angular movement of the output member, whereby to tend to expand the spring radially and prevent the spring from turning in said bore, the input member having oppositely circumferentially facing and spaced apart shoulders, one at each end of the spring, each arranged to be moved into engagement with a respective other abutment of said two pairs of spring abutments, depending upon the direction of angular movement of the input member, for releasing the spring from locking frictional engagement with the drum surface.

5. A cylindrical helical metal spring adapted to serve in a bidirectional no-back coupling, hence requiring a pair of energizing and deenergizing circumferentially and relatively oppositely facing abutments at each end, characterized in that the abutments are formed on metal blocks joined to the end coils of the spring by fused metal and in that the radially facing surfaces of each block are substantially flush respectively with the internal and external peripheral surfaces of the coils of the spring.

UNITED STATES PATENTS

| | | |
|---|---|---|
| Re. 16,565 | Myers | Mar. 1, 1927 |
| Re. 22,852 | Swift, Jr. | Mar. 11, 1947 |
| 1,537,223 | Clas | May 12, 1925 |
| 1,829,825 | Freeman et al. | Nov. 3, 1931 |
| 1,935,147 | Drexler | Nov. 14, 1933 |
| 2,219,877 | Starkey | Oct. 29, 1940 |
| 2,421,814 | Starkey | June 10, 1947 |
| 2,618,764 | Rieber | Nov. 18, 1952 |